D. R. HENDRIX.
BOOT TREE.
No. 8,467. Patented Oct. 28, 1851.
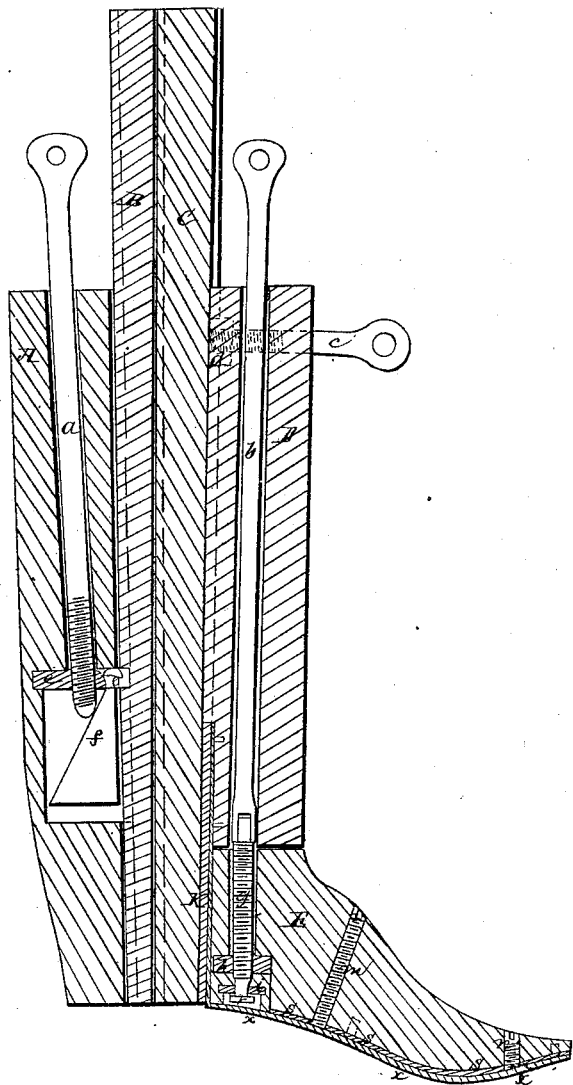

UNITED STATES PATENT OFFICE.

DAVIS R. HENDRIX, OF POTTSTOWN, PENNSYLVANIA.

BOOT-TREE.

Specification of Letters Patent No. 8,467, dated October 28, 1851.

*To all whom it may concern:*

Be it known that I, DAVIS R. HENDRIX, of the borough of Pottstown, Montgomery county, and State of Pennsylvania, have invented a new and useful Improvement on Boot-Trees; and I do hereby declare that the following is a full, clear, and exact description thereof, reference being had to the accompanying drawings and to the letters of reference marked thereon.

The nature of my invention consists in stretching boots or shoes by regulating the set screws in the foot.

The construction of my boot trees are as follows: The foot piece E, with the front piece D joints above the instep.

K is a metal plate fastened to piece d.

K forms a dove tail at the back part foot E, to support the joint.

A is a back piece.

B and C is keys to fill out the tree in the boots.

$a$, is a shank screw in the back piece A which runs through nut $e$.

$f$ is a metal block in the form of a triangle with a hook at the top part which hooks the nut $e$ by screwing shank screw $a$, down and forces block $f$, against key B, which stretches over the heel.

$c$, is a short shank screw at the top of front piece D runs through nut $d$ against key G, which stretches over the leg. $b$ is a socket wrench by which screw $g$ is governed which enters through the piece $b$. Screw $g$ has a shank at the bottom with the female bur $r$ running in the cap $i$ which is fastened to plate $x$ a metal plate extending from shank to toe only fastened in a swivel form at the shank screw $g$ runs through the shank of foot piece E in nut, $h$, by screwing down the screw $g$, forces plate $x$ from the shank which stretches over the instep and out over the ball or toe and by taking out the foot piece E, and setting set screw $n$, so as to fill the toe of the boot and by screwing down screw $g$, will stretch over the ball and not over the instep or toe and by taking out the foot piece E, and setting of plate $x$ with screw $g$, so that the set screw $m$, can be set down to fill the instep of the boot and by screwing screw $g$, the plate $x$ forms a leverage over the set screw $m$, which stretches over the toe and out over the ball or instep $o$ is a narrow metal bar which forms the nuts for the set screws.

What I claim as my invention and desire to secure by Letters Patent is—

The set screws, $m$ and $n$ and plate $x$ in combination with the screw $g$, substantially in the manner and for the purpose herein described and set forth.

Witness my hand Sept. 15, 1851.

D. R. HENDRIX.

Witnesses:
JOHN THOMPSON,
A. S. CUSTER.